United States Patent
Nakajima (10) Patent No.: US 9,804,308 B2
(45) Date of Patent: Oct. 31, 2017

(54) NEAR-INFRARED REFLECTIVE FILM AND NEAR-INFRARED REFLECTOR PROVIDED WITH THE SAME

(75) Inventor: Akihisa Nakajima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 102 days.

(21) Appl. No.: 13/991,748

(22) PCT Filed: Nov. 17, 2011

(86) PCT No.: PCT/JP2011/076527
§ 371 (c)(1),
(2), (4) Date: Jun. 5, 2013

(87) PCT Pub. No.: WO2012/077477
PCT Pub. Date: Jun. 14, 2012

(65) Prior Publication Data
US 2013/0250406 A1    Sep. 26, 2013

(30) Foreign Application Priority Data

Dec. 9, 2010  (JP) .................................. 2010-274485

(51) Int. Cl.
*F21V 9/04*    (2006.01)
*G02B 5/28*    (2006.01)
(Continued)

(52) U.S. Cl.
CPC ........ *G02B 5/282* (2013.01); *B32B 17/10018* (2013.01); *B32B 17/10761* (2013.01);
(Continued)

(58) Field of Classification Search
CPC .......... G02B 5/208; G02B 5/282; G02B 5/28; G02B 5/281; G02B 5/08; G02B 5/20; F21V 9/04; F21V 9/06
(Continued)

(56) References Cited

U.S. PATENT DOCUMENTS 4,652,789 A * 3/1987 Kawakatsu ............ H01K 1/325
                                                          313/112
5,146,130 A * 9/1992 Kawakatsu .............. H01K 1/32
                                                          313/112
(Continued)

FOREIGN PATENT DOCUMENTS

JP    9-101110 A    4/1997
JP    2000-266930 Y    9/2000
(Continued)

OTHER PUBLICATIONS

IPRP and translation thereof, date of issuance of report Jun. 12, 2013.
(Continued)

*Primary Examiner* — Bumsuk Won
*Assistant Examiner* — Balram Parbadia
(74) *Attorney, Agent, or Firm* — Lucas & Mercanti, LLP (57) ABSTRACT

The near-infrared reflective film has, on a base material, a high refractive layer containing a water-soluble polymer and a metal oxide particle having a refractive index higher than the refractive index of the water-soluble polymer, and a low refractive layer containing a water-soluble polymer and a metal oxide particle having a refractive index lower than the refractive index of the water-soluble polymer are alternately laminated individually in two or more layers. The total number of the layers of the high refractive layer and the low refractive layer is n. The total film thickness of the component layers from the region of n/2 to the base material is Σd1, and the total film thickness of the component layers from the region of n/2 to the outermost layer is Σd2. The film thickness ratio Σd1/Σd2 is from 1.05 to 1.80.

10 Claims, 1 Drawing Sheet (51) Int. Cl.
  *B32B 17/10* (2006.01)
  *C03C 17/42* (2006.01)
(52) U.S. Cl.
  CPC ........ *B32B 17/10788* (2013.01); *C03C 17/42* (2013.01); *G02B 5/287* (2013.01); *C03C 2217/734* (2013.01)
(58) Field of Classification Search
  USPC ................ 359/350, 359–361, 577, 580, 584, 359/586–589; 427/160, 162; 252/582, 252/586, 587
  See application file for complete search history.

(56) References Cited

U.S. PATENT DOCUMENTS

| | | | |
|---|---|---|---|
| 2002/0030426 A1* | 3/2002 | Boonekamp | C03C 17/42 313/112 |
| 2004/0202897 A1 | 10/2004 | Kondo | |
| 2007/0275218 A1* | 11/2007 | Kobayashi et al. | 428/212 |
| 2008/0049428 A1* | 2/2008 | Cunningham | H01K 1/325 362/293 |
| 2010/0208349 A1* | 8/2010 | Beer et al. | 359/580 |
| 2010/0218703 A1* | 9/2010 | Bujard et al. | 106/438 |

FOREIGN PATENT DOCUMENTS

| | | | | |
|---|---|---|---|---|
| JP | 2000-314808 A | 11/2000 | | |
| JP | 2003267754 | 9/2003 | | |
| JP | 2004-309934 A | 11/2004 | | |
| JP | 2005052972 A | * 3/2005 | ............. | B32B 27/32 |
| JP | 2009086659 A | * 4/2009 | ............... | G02B 5/26 |
| JP | 2009544491 | 12/2009 | | |
| JP | 2010-78714 A | 4/2010 | | |

OTHER PUBLICATIONS

Office Action dated Mar. 24, 2015 for corresponding Japanese Patent Application No. 2012-547762 (4 Pages).

English translation of Office Action dated Mar. 24, 2015 for corresponding Japanese Patent Application No. 2012-547762 (7 Pages).

Extended European Search Report dated Jul. 22, 2015 issued from the corresponding European Patent Application No. 11846124.3.

* cited by examiner

NEAR-INFRARED REFLECTIVE FILM AND NEAR-INFRARED REFLECTOR PROVIDED WITH THE SAME

CROSS REFERENCE TO RELATED APPLICATION

This is a U.S. National Phase Application under 35 U.S.C. 371 of International Application PCT/JP2011/076527, filed Nov. 17, 2011, which claims the priority of Japanese Application No. 2010-274485, filed Dec. 9, 2010, the entire content of both Application are hereby incorporated by reference.

TECHNICAL FIELD

The present invention relates to a near-infrared reflective film which has an excellent near-infrared reflecting power and an excellent visible light uniformity, and a near-infrared reflector provided with the same.

Technical Field

In recent years, for reducing electric energy for cooling in summertime, energy saving techniques which prevent heat radiant energy of sunlight from entering a room through a windowpane of a house or an office draw attention, and evaluation of a variety of films therefor is seen on the Ministry of the Environment website.

For such films, a variety of methods are proposed such as a method of absorbing a near-infrared ray using a film on which a near-infrared ray absorbing pigment is contained; a method of sputtering metal on the surface of a base material and reflecting heat radiant energy; and a method of utilizing interference and reflection on a laminated body which is formed by alternately laminating layers having different refractive indices.

Among the above-mentioned proposed methods, the method of using a near-infrared ray absorbing pigment has a characteristic that a film per se is heated; and the method of sputtering metal has a characteristic that not only a near-infrared light, but a visible light or the like is reflected. On the other hand, in the method of using a laminated body formed by alternately laminating layers having different refractive indices, since only a near-infrared light can be efficiently reflected, a film is not heated and a visible light is allowed to pass through the film. For this reason, the method of using a laminated body formed by alternately laminating layers having different refractive indices is a technique which is highly useful for a near-infrared reflective film for windows.

In the method of alternately laminating layers having different refractive indices, generally, in cases where a light in the near-infrared region is reflected, by letting the wavelength of the light in the near-infrared region be $\lambda$, and setting the optical film thickness (refractive index×physical film thickness) of each layer to $\lambda/4$, the light is allowed to be reflected centering on $\lambda$. In this case, when the number of the film layers is large, the reflectivity near $\lambda$ increases. However, the wavelength width where the light can be reflected decreases, whereby a ripple-shaped reflection sideband is generated around the main reflection and a strong interference reflection is generated in the visible light region adjacent to the near-infrared region. Therefore, the wavelength width where the light can be reflected decreases only by simply increasing the number of layers of a laminated body. As the result, the effect of reflecting sunlight radiant energy decreases and the interference unevenness in the visible light increases.

For the above-mentioned problems, methods for reflecting a wide range of wavelengths are examined. For example, as a technique of an optical lens, proposed is an infrared ray cut filter in which a multiple layer formed by alternately laminating 16 to 32 layers of high refractive index thin films made of a high refractive index material and low refractive index thin films made of a low refractive index material is formed on a transparent substrate, wherein the first and second layers from the transparent substrate are formed in an optical film thickness of ($\lambda/4$) or larger, the third layer to the sixth layer or the seventh layer from the transparent substrate are formed in an optical film thickness of ($\lambda/4$) or smaller, the layer between the seventh or eighth layer and the last layer is formed in an optical film thickness of ($\lambda/4$) or larger, and the last layer is formed in an optical film thickness of ($\lambda/4$) or smaller (see, for example, Patent Document 1).

PRIOR ART DOCUMENT

Patent Document

[Patent Document 1] JP-B-4404568

SUMMARY OF THE INVENTION

Problems to be Solved by the Invention

However, in the method described in Patent Document 1, there has been a problem that the visible light transmittance is reduced because the transmittance in a wavelength region of from 550 nm to 750 nm gradually decreases although reflection in the near-infrared region is manifested.

In addition, when film-forming is performed on a plastic film, crack occurs while heating during sputtering film-forming or cooling to room temperature at the time of takeoff. Accordingly, the thus obtained film could not be used as it was. Furthermore, since the film thicknesses are complicated, it was difficult to determine the optimum condition therefor.

Accordingly, an object of the present invention is to provide a near-infrared reflective film having wide range reflection in the near-infrared region, and not having irregularity of reflectivity in the visible light region, and not generating crack during film-forming by using an inorganic material and a water-soluble resin in combination, and a near-infrared reflector provided with the same.

Means for Solving the Problems

The above-mentioned object of the present invention is attained by the following constitutions.

1. A near-infrared reflective film having a constitution in which, on a base material, a high refractive layer containing a water-soluble polymer and a metal oxide particle having a refractive index higher than the refractive index of the water-soluble polymer and a low refractive layer containing a water-soluble polymer and a metal oxide particle having a refractive index lower than the refractive index of the water-soluble polymer are alternately laminated individually in two or more layers, characterized in that, letting the total number of the layers of the high refractive layer and the low refractive layer be n, the total film thickness of the component layers from the region of n/2 to the base material be $\Sigma d1$, and the total film thickness of the component layers from the region of n/2 to the outermost layer be $\Sigma d2$, the film thickness ratio $\Sigma d1/\Sigma d2$ is from 1.05 to 1.80.

2. The near-infrared reflective film according to the item 1, wherein the film thickness ratio $\Sigma d1/\Sigma d2$ is from 1.05 to 1.25.

3. A near-infrared reflector characterized by comprising, on the at least one side of the substrate, the near-infrared reflective film according to the item 1 or 2.

Effect of the Invention

By the present invention, a near-infrared reflective film having wide range reflection in the near-infrared region, having a high transmittance in the visible light region, and not having irregularity in visible light reflectivity, and a near-infrared reflector provided with the same were able to be provided.

MODES FOR CARRYING OUT THE INVENTION

The embodiment for carrying out the present invention will now be described in detail.

The present inventor intensively studied the above-mentioned problems to find out that, by a near-infrared reflective film having a constitution in which, on a base material, a high refractive layer containing a water-soluble polymer and a metal oxide particle having a refractive index higher than the refractive index of the water-soluble polymer and a low refractive layer containing a water-soluble polymer and a metal oxide particle having a refractive index lower than the refractive index of the water-soluble polymer are alternately laminated individually in two or more layers, characterized in that, letting the total number of the layers of the high refractive layer and the low refractive layer be n, the total film thickness of the component layers from the region of n/2 to the base material be $\Sigma d1$, and the total film thickness of the component layers from the region of n/2 to the outermost layer be $\Sigma d2$, the film thickness ratio $\Sigma d1/\Sigma d2$ is from 1.05 to 1.80, a near-infrared reflective film having wide range reflection in the near-infrared region, having a high transmittance in the visible light region, and not having irregularity in visible light reflectivity can be attained, thereby arriving at the present invention.

In other words, from the viewpoint of widening the reflection region, the film may be constituted by changing the value of the film thickness of each component layers, and it was found that, by setting the film thickness ratio of the component layers under the conditions defined in the present invention, a near-infrared reflective film is attained which has an excellent near-infrared reflecting power in which a wider range reflection characteristic in the near-infrared region can be obtained compared to a film constituted by having the same film thicknesses for all high refractive layers or low refractive layers, respectively, and in which a specific strong reflection is not generated in the visible light region, and small interferences are superposed in the full visible light region, thereby completing the present invention.

The near-infrared reflective film of the present invention will now be described in detail.

<<Near-Infrared Reflective Film>>

Figure 1:
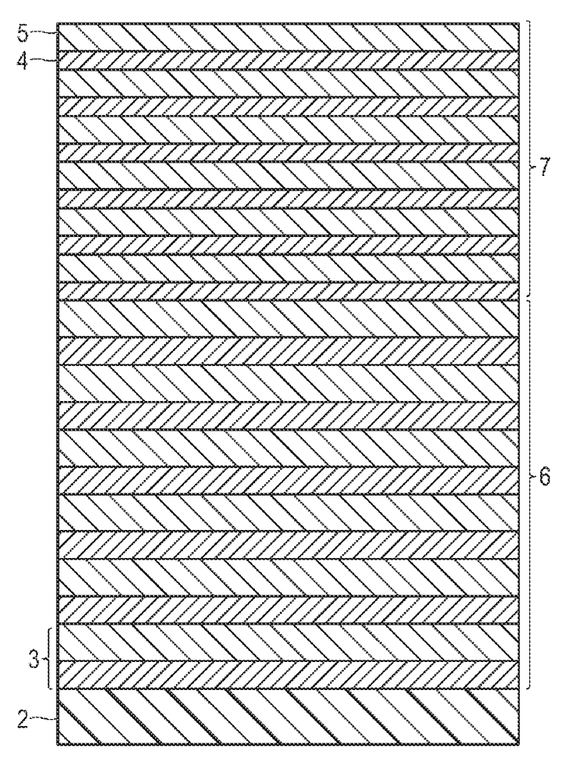
FIG. 1 illustrates one embodiment of the near-infrared reflective film of the present invention.

As shown in FIG. 1, a near-infrared reflective film of the present invention is constituted by, when, on a base material 2, a high refractive layer 5 containing a water-soluble polymer and a metal oxide particle having a refractive index higher than the refractive index of the water-soluble polymer and a low refractive layer 4 containing a water-soluble polymer and a metal oxide particle having a refractive index lower than the refractive index of the water-soluble polymer are formed into an adjacent structure to form a unit 3, at least two of the units. In addition, the near-infrared reflective film of the present invention is characterized in that, letting the total number of the layers of the high refractive layer and the low refractive layer be n, when the total film thickness of the component layers 6 on the base material side from n/2 position, namely, ½ position of the total number of the layers as a standard (also referred to as "lower layer region") is $\Sigma d1$ and when the total film thickness of the component layers 7 from the standard position to the outermost layer (also referred to as "upper layer region") is $\Sigma d2$, the film thickness ratio $\Sigma d1/\Sigma d2$ is from 1.05 to 1.80.

When the total number of the layers n is an even number, a boundary region (n/2) between a lower layer region from a $layer_1$ seen from the base material side to a $layer_{n/2}$ and an upper layer region from $layer_{(n/2)+1}$ to $layer_n$ is the interface between the $layer_{n/2}$ and the $layer_{(n/2)+1}$. For example, when the total number of the layers is 4, the first layer and the second layer adjacent to the base material are a lower layer region ($\Sigma d1$); the third layer and the fourth layer are an upper layer region ($\Sigma d2$); and the interface between the second layer and the third layer is a boundary region (n/2). When the total number of the layers n is an odd number, by setting a layer corresponding to the boundary region (n/2) as a standard, the total film thickness of the component layers on the lower layer side from the layer corresponding to the boundary region (n/2) and excepting the layer corresponding to the boundary region (n/2) is defined as $\Sigma d1$, and the total film thickness of the component layers on the upper layer side from the layer corresponding to the boundary region (n/2) and excepting the layer corresponding to the boundary region (n/2) is defined as $\Sigma d2$. For example, when the total number of the layers is 5, the first layer and the second layer adjacent to the base material are the lower layer region ($\Sigma d1$); the third layer is the boundary region (n/2); and the fourth layer and the fifth layer are the upper layer region ($\Sigma d2$).

The total number of the layers is measured by observing the cross-section with electron microscope. In this case, when the interface between the two layers cannot be clearly observed, a metal oxide particle in the high refractive layer contained in the interface is used for judgment. In other words, in the EDX profile of the metal oxide particle of the high refractive layer in the thickness direction, the position where the count number of the metal oxide particle of the high refractive layer is ½ is defined as the interface between the two layers.

Although the present invention is characterized in that at least two units each constituted by a high refractive layer and a low refractive layer are laminated, it is preferred that the refractive index difference between the adjacent high refractive layer and low refractive layer be 0.1 or larger. Further, regarding the optical properties of the near-infrared reflective film of the present invention, it is preferred that the transmittance in the visible light region according to JIS R3106-1998 be 50% or higher, and that the film preferably have a region where the reflectivity is higher than 50% in a wavelength region of 900 nm to 1,400 nm.

In general, it is preferred that the near-infrared reflective film be designed such that the refractive index difference between the high refractive layer and the low refractive layer is large from the viewpoint that a high infrared reflectivity can be obtained with the small number of layers. In the present invention, it is preferred that the film comprises at least two units each constituted by the high refractive layer and the low refractive layer, and that the refractive index difference between the adjacent high refractive layer and low refractive layer be 0.1 or larger, more preferably 0.3 or larger, and still more preferably 0.4 or larger.

The reflectivity of a specific wavelength region depends on the refractive index difference between two adjacent layers and the number of layers; the larger the difference of the refractive indices, the smaller the number of layers by which the same reflectivity is obtained. The refractive index difference and the number of layers needed can be calculated using a commercially available optical design software. For example, in order to obtain the infrared reflectivity of 90% or higher, when the refractive index difference is smaller than 0.1, 20 layers or more are needed to be laminated, which not only decreases the productivity, but increases scattering at the interfaces of the lamination, thereby reducing the transparency and making it difficult to produce the film without failure. From the viewpoint of improving the reflectivity and decreasing the number of layers, the refractive index difference has no upper limit. Substantially, the limit is about 1.40.

Next, a fundamental constitution summary of the near-infrared reflective film of the present invention will now be described.

A near-infrared reflective film of the present invention has a constitution in which, on a base material, at least two units each constituted by a high refractive layer containing a water-soluble polymer and a metal oxide particle having a refractive index higher than the refractive index of the water-soluble polymer and a low refractive layer containing a water-soluble polymer and a metal oxide particle having a refractive index lower than the refractive index of the water-soluble polymer are laminated. The range of the total number of the layers of the near-infrared reflective film of the present invention is preferably 100 layers or less, namely, 50 units or less, and more preferably 40 layers (20 units) or less, and still more preferably 4 layers (2 units) or more and 20 layers (10 units) or less.

In the near-infrared reflective film of the present invention, the refractive index difference of the adjacent high refractive layer and the low refractive layer is preferably 0.1 or larger. In the case that the film comprises a plurality of high refractive layers and low refractive layers as mentioned above, all the refractive index layers preferably satisfy requirements defined in the present invention. Note that the outermost layer and the bottom layer may have a constitution which does not satisfy suitable requirement that the present invention defines.

In the near-infrared reflective film of the present invention, preferably, a metal oxide particle is added to the high refractive layer, and more preferably, the metal oxide particle is added to both the high refractive layer and the low refractive layer.

In the present invention, the refractive index of each component can be determined by the method below.

A sample in which a refractive index layer which is an object to be measured is coated on a base material in a single layer is produced, and cut into 10 cm×10 cm pieces, and the refractive indices of the high refractive layer and the low refractive layer of the present invention are determined according to the following method. More specifically, the refractive indices can be determined by a method in which the surface opposite to the surface of the sample to be measured (back surface) is subjected to a roughening treatment by using U-4000 type (manufactured by Hitachi, Ltd.) as a spectrophotometer to prevent reflection of a light on the back surface, and the reflectivities are measured at 25 points in the visible light region (400 nm to 700 nm) under a condition of five-degree regular reflection to calculate the average value, by which the average refractive index is determined; or determined by a method in which an F20 desktop film thickness measurement system (Film Thickness/Refractive Index Measuring Device manufactured by Filmetrics Japan, Inc.) is used.

The refractive index of the water-soluble polymer which constitutes the high refractive layer or the low refractive layer can also be determined by the same method as above, by producing a sample in which a water-soluble polymer which is an object to be measured is coated on a base material in a single layer.

The refractive index of the metal oxide particle which constitutes the high refractive layer or the low refractive layer can be measured according to the method B (immersion method using a microscope (Becke line method)) in JIS K7142 "method for the determination of the refractive index of plastic". For the immersion liquid used in JIS K7142, a "Contact Liquid" manufactured by Shimadzu Device Corporation is to be used, and for the microscope, polarizing microscope "ECLIPSE E600 POL" (manufactured by Nikon Corporation) is to be used.

The film thickness of each of the high refractive layer and the low refractive layer, the total film thickness of the component layers from the intermediate region to the base material $\Sigma d1$, and the total film thickness of the component layers from the intermediate region to the outermost layer $\Sigma d2$ can be determined by trimming and exposing the cross-section of the near-infrared reflective film constituted by laminating the high refractive layers and the low refractive layers of the present invention, and then observing the cross-section using a scanning electron microscope.

[High Refractive Layer]

The high refractive layer of the present invention is characterized by containing a water-soluble polymer and a metal oxide particle having a refractive index higher than the refractive index of the water-soluble polymer. When the high refractive layer contains a plurality of water-soluble polymers and/or metal oxide particles, the component which has the largest content in each of the water-soluble polymers and the metal oxide particles is to be employed as a target for comparison of refractive index.

The refractive index of the high refractive layer is preferably 1.80 to 2.50, and more preferably 1.90 to 2.20.

The film thickness of the high refractive layer is preferably 20 nm to 1,000 nm, and more preferably 50 nm to 500 nm.

(Metal Oxide Particle)

The metal oxide particle to be used for the high refractive layer of the present invention has a refractive index higher than that of the water-soluble polymer which constitutes the high refractive layer.

A metal oxide particle which is able to be used cannot be defined only by the types of the water-soluble polymer to be applied, and the refractive index thereof is usually 2.00 or higher, preferably 2.00 or higher and 3.00 or lower. The volume average particle size thereof is usually 100 nm or smaller. Specific examples thereof include zirconium oxide ($ZrO_2$), cerium oxide ($CeO_2$) and titanium oxide ($TiO_2$). Among these, a rutile-type titanium dioxide particle having a high refractive index is preferably used.

<Rutile-Type Titanium Dioxide>

In general, titanium oxide particles are usually used in a state in which the particles have been subjected to a surface treatment for the purpose of inhibiting the photocatalytic activity on the surface of the particles, or improving dispersibility to solvent or the like. For example, titanium oxide particles whose surface is covered with a covering layer and negatively charged, and titanium oxide particles on which a covering layer composed of oxide of aluminium is formed and whose surface is positively charged when the pH is 8 to 10 are known. In the present invention, a titanium oxide aqueous sol which is not subjected to such a surface treatment, whose pH is 1.0 to 3.0 and whose zeta potential is positive is preferably used.

The volume average particle size of the rutile-type titanium dioxide particle of the present invention is preferably 100 nm or smaller, more preferably 4 nm or larger and 50 nm or smaller, and still more preferably 4 nm or higher and 30 nm or smaller. When the volume average particle size is less than 100 nm, the film has a small haze, which is preferable from the viewpoint that the visible light transmittance is excellent. When the volume average particle size is larger than 100 nm, the particle can be suitably applied to the high refractive layer, which is preferable.

The volume average particle size of the rutile-type titanium dioxide particle of the present invention is the volume average particle size of a primary particle or a secondary particle dispersed in a medium; the volume average particle size is determined by laser diffractometry. The laser diffractometry is a method of detecting a diffracted light and/or a scattered light generated when the particle is irradiated with a laser light. When the particle is irradiated with a laser light, a diffracted/scattered light is generated in various directions depending on the size of the particle. For example, the particle size is in the order about millimeter to micrometer, the diffracted/scattered light is concentrated on the side of the travel direction of the irradiation laser, and as the particle size decreases from micrometer to nanometer, the diffracted/scattered light extends in the opposite side to the travel direction of the laser. The laser diffractometry is a method of detecting such diffracted/scattered lights by a sensor and analyzing the strength distribution thereof to determine the particle size.

Further, the titanium oxide particle of the present invention is preferably monodispersion. The term "monodispersion" herein means that the degree of monodispersion determined by the following formula is 40% or less. Still more preferably, the particle has a degree of monodispersion of 30% or less, and particularly preferably 0.1 to 20%.

Degree of monodispersion=(Standard deviation of a particle size)/(Average particle size)×100  [Formula 1]

<Production Method of Rutile-Type Titanium Dioxide Sol>

In a method of producing a near-infrared reflective film of the present invention, an aqueous titanium oxide sol whose pH is from 1.0 to 3.0 and in which the zeta potential of the titanium particle is positive is preferably used as a rutile-type titanium dioxide when an aqueous high refractive layer coating liquid is prepared.

Regarding a method of preparing a rutile-type titanium dioxide sol which can be used in the present invention, for example, JP-A-S63-17221, JP-A-H7-819, JP-A-H9-165218, JP-A-H11-43327, JP-A-S63-17221, JP-A-H7-819, JP-A-H9-165218, JP-A-H11-43327 or the like can be referred to.

Regarding other methods of preparing rutile-type titanium dioxide of the present invention, for example, "Titanium oxide-Physical Properties and Applied Technology" (Manabu Kiyono pp 255 to 258 (2000) GIHODO SHUPPAN Co., Ltd., or a method in process (2) in paragraphs 0011 to 0023 of WO2007/039953 can be referred to.

The production method using the above-mentioned process (2) is composed of a process (2) in which, after a process (1) in which a titanium dioxide hydrate is processed with at least one basic compound selected from the group consisting of a hydroxyl article of an alkali metal and a hydroxide of an alkaline earth metal, the titanium dioxide dispersoid obtained is processed with a carboxylic acid group containing compound and inorganic acid. In the present invention, an aqueous sol of a rutile-type titanium dioxide whose pH is adjusted to from 1.0 to 3.0 by the inorganic acid obtained in the process (2) may be used.

(Water-Soluble Polymer)

A water-soluble polymer which is applicable to the high refractive layer of the present invention is not particularly limited, but preferably contains at least one water-soluble polymer selected from the group consisting of, for example, celluloses, polysaccharide thickeners, polymers obtained by vinyl polymerization, and gelatins. The refractive index of the water-soluble polymer is preferably 1.50 or higher and smaller than 2.00.

The term "water-soluble polymer" in the present invention is defined as a polymer which dissolves in an amount of 1.0% by mass or larger, and preferably 5.0% by mass or larger in water of 25° C.

<Celluloses>

Among celluloses which can be used in the present invention, water-soluble cellulose derivatives can be preferably used, and examples thereof include water-soluble cellulose derivatives such as carboxymethyl cellulose (cellulose carboxymethyl ether), methylcellulose, hydroxymethyl cellulose, hydroxyethyl cellulose, and hydroxypropyl cellulose; and carboxylic acid group containing celluloses such as carboxymethyl cellulose (cellulose carboxymethyl ether) and carboxyethyl cellulose.

<Polysaccharide Thickener>

The polysaccharide thickener which can be used in the present invention is not particularly limited, but, for example, generally known natural simple polysaccharides, natural complex polysaccharides, synthetic simple polysaccharides, and synthetic complex polysaccharides can be used. For the details of these polysaccharides, see "Encyclopedia of Biochemistry (Seikagaku Jiten) second edition, published by Tokyo Kagaku Dojin", "Food Industry" volume 31 (1988) page 21, or the like.

The polysaccharide thickener in the present invention refers to a polymer of saccharides, which has a large number of hydrogen bonding groups in the molecule. The polysaccharide thickener has a characteristic that the difference between the viscosity in a low temperature and the viscosity in a high temperature is large because the hydrogen bonding strength between the molecules differs depending on the temperature. When a metal oxide particle is added to the polysaccharide thickener, the viscosity increases, which is assumed to be caused by the hydrogen bond with the metal oxide particle at a low temperature. The rise in the viscosity at 15° C. is preferably 1.0 mPa·s or larger, and more preferably 5.0 mPa·s or larger, and still more preferably 10.0 mPa·s or larger.

Examples of the polysaccharide thickener which is applicable to the present invention include galactan (for example, agarose, agaropectin), galactomannoglycan (for example, locust bean gum, guaran), xyloglucan (for example, tamarind gum), glucomannoglycan (for example, konjakmannan, wood-derived glucomannan, xanthane gum), galactoglucomannoglycan (for example, coniferous wood-derived glycan), arabinogalactoglycan (for example, soybean-derived glycan, microorganism-derived glycan), glucorhamnoglycan (for example, gellan gum), glycosaminoglycan (for example, hyaluronic acid, keratan sulfate), and red algae-derived natural polymer polysaccharides such as alginic acid and alginate, agar, κ-carrageenan, λ-carrageenan, ι-carrageenan, and furcellaran. Among these, from the viewpoint of not decreasing the dispersion stability of a metal oxide fine particle coexisting in a coating liquid, polysaccharide thickeners not having, as a constitution unit, a carboxylic acid group or a sulfonic acid group are preferred. Preferred examples of such polysaccharide thickeners include a polysaccharide thickener composed of only a pentose(s) such as L-arabitose, D-ribose, 2-deoxyribose, D-xylose; and a hexose(s) such as D-glucose, D-fructose, D-mannose, D-galactose. Specifically, tamarind seed gum known to be xyloglucan whose principal chain is glucose and whose side chain is also glucose; guar gum, cationic guar gum, hydroxypropyl guar gum, locust bean gum, tara gum known to be galactomannan whose principal chain is mannose and whose side chain is glucose; and arabinogalactan whose principal chain is galactose and whose side chain is arabinose are preferably used. In the present invention, tamarind, guar gum, cationic guar gum, and hydroxypropyl guar gum are particularly preferred.

Further, in the present invention, two or more polysaccharide thickeners are preferably used in combination <Polymers Obtained by Vinyl Polymerization>

As a water-soluble polymer applicable to the present invention, polymers obtained by vinyl polymerization can be used. Examples thereof include polyvinyl alcohols; polyvinylpyrrolidones; acrylic resin such as polyacrylic acid, acrylic acid-acrylonitrile copolymer, acrylic acid potassium-acrylonitrile copolymer, vinyl acetate-acrylic acid ester copolymer, or acrylic acid-acrylic acid ester copolymer; styrene acrylic acid resin such as styrene-acrylic acid copolymer, styrene-methacrylic acid copolymer, styrene-methacrylic acid-acrylic acid ester copolymer, styrene-α-methyl styrene-acrylic acid copolymer, or styrene-α-methyl styrene-acrylic acid-acrylic acid ester copolymer; styrene-sodium styrenesulfonate copolymer, styrene-2-hydroxy ethyl acrylate copolymer, styrene-2-hydroxy ethyl acrylate-potassium styrenesulfonate copolymer, styrene-maleic acid copolymer; and salts thereof. Among these, examples of particularly preferable polymer include polyvinyl alcohol, polyvinylpyrrolidones and copolymers containing the same.

The weight-average molecular weight of the water-soluble polymer is preferably from 1,000 to 200,000. Further, the weight-average molecular weight is more preferably from 3,000 to 40,000. In the present specification, the weight-average molecular weight is determined by Gel Filtration Column Chromatography (GFC). Specifically, the weight-average molecular weight is determined by a calibration curve produced by a standard sample using GPC101 (manufactured by Showa Denko K.K.). As the standard sample, pullulan is used.

Examples of polyvinyl alcohol preferably used in the present invention include normal polyvinyl alcohol obtained by hydrolysis of polyvinyl acetate as well as modified polyvinyl alcohols such as polyvinyl alcohols the end of which is cationically modified, polyvinyl alcohols the end of which is anionically modified and polyvinyl alcohols the end of which is nonionically modified.

With respect to polyvinyl alcohol obtained by hydrolysis of vinyl acetate, those having an average degree of polymerization of 1,000 or higher are preferably used, and in particular, those having an average degree of polymerization of 1,500 to 5,000 are preferably used. The saponification degree is preferably 70 to 100%, and particularly preferably 80 to 99.5%.

The cationic modified polyvinyl alcohol is a polyvinyl alcohol comprising a primary to tertiary amino group or a quaternary ammonium group in the principal chain or side chain of the above-mentioned polyvinyl alcohol as described in, for example, JP-A-S61-10483, and is obtained by saponifying a copolymer of an ethylenically unsaturated monomer having a cationic group and vinyl acetate.

Examples of an ethylenically unsaturated monomer having a cationic group include trimethyl-(2-acrylamide-2,2-dimethylethyl) ammonium chloride, trimethyl-(3-acrylamide-3,3-dimethylpropyl) ammonium chloride, N-vinylimidazole, N-vinyl-2-methylimidazole, N-(3-dimethylaminopropyl)methacrylamide, hydroxyl ethyl trimethyl ammonium chloride, trimethyl-(2-methacrylamide propyl) ammonium chloride, and N-(1,1-dimethyl-3-dimethylaminopropyl) acrylamide. The ratio of a cationic modified group containing monomer of the cationic modified polyvinyl alcohol is 0.1 to 10 mol %, and preferably 0.2 to 5 mol % with respect to vinyl acetate.

Examples of the anionic modified polyvinyl alcohol include polyvinyl alcohol having an anionic group as described in JP-A-H1-206088, a copolymer of vinyl alcohol and vinyl compound having a water-soluble group as described in JP-A-S61-237681 and JP-A-S63-307979, and a modified polyvinyl alcohol having a water-soluble group as described in JP-A-H7-285265.

Examples of the nonionic modified polyvinyl alcohol include polyvinyl alcohol derivatives in which polyalkylene oxide group is added to a part of vinyl alcohol as described in JP-A-H7-9758; and a block copolymer of vinyl compound having a hydrophobic group and vinyl alcohol as described in JP-A-H8-25795. Two or more of the polyvinyl alcohols having different degrees of polymerization or different types of modification can be used in combination.

In the present invention, when a polymer obtained by vinyl polymerization is used, a curing agent may be used. When the polymer obtained by vinyl polymerization is polyvinyl alcohol, boric acid and salts thereof or epoxy-based curing agents are preferred.

<Gelatin>

In the high refractive layer of the present invention, gelatins can be used as a water-soluble polymer.

For a gelatin applicable to the present invention, a wide variety of gelatins which have been widely used in the field of silver halide photosensitive materials can be applied. For example, an acid-treated gelatin, an alkali-treated gelatin, as well as, an enzyme-treated gelatin which is treated with an enzyme in the production process of gelatin and gelatin derivatives, in other words, a modified gelatin obtained by treating a gelatin which has, as a functional group, an amino group, an imino group, a hydroxyl group, a carboxyl group in the molecule with a reagent having a group which can be reacted with these functional groups can also be used. A general method of producing a gelatin is well-known, and, for example, T. H. James: The Theory of Photographic Process 4th. ed. 1977 (Macmillan) pp. 55; Scientific Photography Manual vol. I, pp. 72 to 75, published by Maruzen Company, Limited; Fundamentals of Photographic Engineering—Silver Halide Photography—, published by Corona Publishing K.K., pp. 119 to 124; or the like can be referred to. A gelatin described in Research Disclosure Vol. 176, No. 17643, December 1978, section IX can be exemplified.

One example of gelatins applicable to the present invention includes a low molecular weight gelatin or a collagen peptide. The low molecular weight gelatin in the present invention refers to a gelatin having a weight-average molecular weight of 30,000 or lower, preferably 2,000 to 30,000 and more preferably, 5,000 to 25,000. The collagen peptide in the present invention is defined as a protein which is obtained by decomposing a gelatin into low molecules and which does not manifest sol-gel transition.

The low molecular weight gelatin or the collagen peptide can be obtained by adding a gelatinase to a normally employed aqueous solution of a high molecular weight gelatin having a weight-average molecular weight of about 100,000 to be enzymatically decomposed; adding an acid or an alkali to the gelatin while heating to be hydrolyzed; thermally decomposing the gelatin by heating under atmosphere pressure or under an applied pressure; decomposing the gelatin by irradiating with an ultrasonic wave; or using these methods in combination.

In the present invention, as one type of gelatin, a high molecular weight gelatin having a weight-average molecular weight of 100,000 or higher can also be used, and examples thereof include a lime-treated gelatin, an acid-treated gelatin and an alkali-treated gelatin.

In the present invention, the weight-average molecular weight and the molecular weight distribution of the gelatin can be measured by, for example, Gel Permeation Chromatography (GPC method).

As described in D. Lorry and M. Vedrines, Proceedings of the 4th IAG Conference, September 1983, P. 35, Takashi Ohno, Hiroyuki Kobayashi, and Shinya Mizusawa, "The Journal of Japan Photographic Society", Vol. 47, 1984, pp. 237 or the like, with respect to the molecular weight of the gelatin, the gelatin is generally composed of an $\alpha$ component (molecular weight of about 100,000), a $\beta$ component which is a dimer thereof, a $\gamma$ component which is a trimer thereof, a high molecular weight component which is a monomer, and further, a low molecular weight component which is obtained by randomly cutting these components.

The high molecular weight gelatin of the present invention whose weight-average molecular weight is 100,000 or higher is a gelatin mainly composed of, among the above-mentioned components, an $\alpha$ component (molecular weight of about 100,000) which is a constituent unit of a collagen, a $\beta$ component which is a dimer thereof and a $\gamma$ component which is a trimer thereof.

Examples of a method of producing a high molecular weight gelatin having a weight-average molecular weight of 100,000 or higher of the present invention include the following methods.

1) In an extracting operation in the production of the gelatin, an extract at the last stage of extraction is used and an extract at the beginning stage of extraction (low molecular weight component) is excluded.

2) In the production method, in the process from the extraction to drying, the treatment temperature is lower than 40° C.

3) The gelatin is subjected to a cool water (15° C.) dialysis.

By using the above-mentioned methods alone or in combination, a high molecular weight gelatin having a weight-average molecular weight of 100,000 or higher can be obtained.

In the present invention, each of the above-mentioned water-soluble polymers is preferably contained in an amount of from 5.01 by mass to 50% by mass, and more preferably from 10% by mass to 40% by mass with respect to the total mass of the high refractive layer. When, together with a water-soluble polymer, for example, an emulsion resin is used in combination, the water-soluble polymer may be contained in an amount of 3.0% by mass or larger. When the amount of the water-soluble polymer is small, there is a high tendency to deterioration of the transparency due to disturbance of the surface of the film when the film is dried after the coating of the high refractive layer. On the other hand, when the content is 50% by mass or smaller, a relative content of the metal oxide particle is appropriate, which makes it easy to make the refractive index difference between the high refractive layer and the low refractive layer large.

[Low Refractive Layer]

The low refractive layer of the present invention is characterized by containing a water-soluble polymer and a metal oxide particle having a refractive index lower than the refractive index of the water-soluble polymer, and a constitution in which the refractive index is lower than that of the above-mentioned high refractive layer by at least 0.1 or larger is preferred. When the low refractive layer contains a plurality of water-soluble polymers and/or metal oxide particles, the component which has the largest content in each of the water-soluble polymers and the metal oxide particles is to be employed as a target for comparison of refractive index.

The low refractive layer preferably has a refractive index of 1.6 or lower, more preferably 1.10 to 1.60 and still more preferably 1.30 to 1.50.

A preferred film thickness of the low refractive layer is preferably 20 nm to 800 nm, and more preferably 50 nm to 350 nm.

The metal oxide particle used for the low refractive layer of the present invention has a refractive index lower than that of the water-soluble polymer which constitutes the low refractive layer.

The metal oxide particle which is able to be used cannot be defined only by the types of the water-soluble polymer to be applied, and the refractive index thereof is preferably 1.05 or higher and lower than 1.50. Specifically, silicon oxide ($SiO_2$) is preferably used, and an acidic colloidal silica sol is particularly preferably used.

The average particle size of the silicon oxide is preferably 100 nm or smaller. The average particle size of silicon oxide dispersed in a primary particle state (the particle size in a dispersion state before coating) is preferably 20 nm or smaller, and more preferably 10 nm or smaller. From the viewpoint of small haze and excellent visible light transmittance, the average particle size of the secondary particle is preferably 30 nm or smaller.

The average particle size of the metal oxide particle of the present invention is determined as a simple average (number average) by observing a particle per se or a particle appeared on the cross section or the surface of the refraction layer with an electron microscope to measure the particle size of any of 1,000 particles. The sizes of the respective particles are represented in diameter when assuming an equivalent circle on the projected area thereof.

As the water-soluble polymer used for the low refractive layer, the same water-soluble polymer as described in the above-mentioned high refractive layer is preferred, and in other words, preferably contains at least one water-soluble polymer selected from the group consisting of celluloses, polysaccharide thickeners, polymers obtained by vinyl polymerization, and gelatins. The water-soluble polymer or the like used in the high refractive layer and the low refractive layer may be the same or different, and are preferably the same water-soluble polymer from the viewpoint of carrying out simultaneous multiple layer coating. The refractive index of the water-soluble polymer is preferably 1.50 or higher and smaller than 2.00.

[Other Additives]

For the high refractive layer and the low refractive layer of the present invention, a wide variety of additives may be used as needed.

<Amino Acid Having an Isoelectric Point of 6.5 or Lower>

The amino acid in the present invention is a compound comprising an amino group and a carboxyl group in the same molecular, and may be an amino acid of any types of α-, β-, γ- or the like, and is characterized that the amino acid has an isoelectric point of 6.5 or less. Although some amino acids have optical isomers, there is no difference in the effect of the amino acid due to the existence of optical isomers in the present invention, and any isomer can be used alone or also in a racemic body.

For a detail explanation of amino acids according to the present invention, see the description in "the Encyclopedia of Chemistry, vol. 1" (Kagaku Daijiten 1), an abridged edition, 1960, published by Kyoritsu Shuppan Co., Ltd", pages 268-270.

Specific examples of a preferred amino acid include aspartic acid, glutamic acid, glycin and serine. In particular, glycin and serine are preferred.

The isoelectric point of an amino acid refers to a specific pH value at which the amino acid has a positive charge and a negative charge in the molecule which are balanced, where the charge of the amino acid as a whole is 0. In the present invention, an amino acid having an isoelectric point of 6.5 or less is used. The isoelectric point of each amino acid can be determined by isoelectric point electrophoresis at low ionic strength.

<Emulsion Resin>

The high refractive layer and the low refractive layer of the present invention preferably further contain an emulsion resin.

The emulsion resin of the present invention refers to a resin minute particle obtained by keeping an oil-soluble monomer in an emulsified state in an aqueous solution containing a dispersant, and subjecting the oil-soluble monomer to emulsion polymerization by using a polymerization initiator.

The emulsion resin of the present invention is obtained by mixing an oil-soluble monomer which is dispersed in an aqueous medium in a fine emulsified state, for example, in an average particle size of about 0.01 to 2.0 μm with a dispersant, and subjecting the oil-soluble monomer to emulsion polymerization.

Examples of the oil-soluble monomer which is subjected to emulsion polymerization by the above-mentioned high molecular weight dispersant include an ethylene monomer such as an acrylic acid ester, a methacrylic acid ester, a vinyl compound or a styrene compound; a homopolymer or a copolymer of a diene-based compound such as butadiene or isoprene. Examples of the emulsion resin include acrylic resin, styrene-butadiene resin and ethylene-vinyl acetate resin.

Examples of the dispersant used at the time of emulsion polymerization generally include a low molecular weight dispersant such as alkyl sulfonate, alkyl benzene sulfonate, diethylamine, ethylenediamine, and a quaternary ammonium salt; a high molecular weight dispersant such as polyoxyethylene nonyl phenyl ether, polyoxyethylene lauryl acid ether, hydroxy ethyl cellulose, and polyvinylpyrrolidone; and a high molecular weight dispersant having a hydroxy group.

The high molecular dispersant having a hydroxy group refers to a high molecular weight dispersant whose weight-average molecular weight is 10,000 or higher, and in which the side chain and/or the end thereof is/are substituted with a hydroxy group. A basic difference in the polymer components of the obtained emulsion resins due to the type of the dispersant to be used is not observed. However, when emulsion polymerization is performed by using a high molecular weight dispersant having a hydroxy group, the existence of a hydroxy group at least on the surface of the fine minute particle is presumed, and the chemical and physical properties of the emulsion are different from those of an emulsion resin obtained by polymerization using other dispersants. Examples of the high molecular weight dispersant containing a hydroxy group include those obtained by copolymerization of 2-ethylhexyl acrylate with an acrylic polymer such as polyacrylic soda polyacrylic amide; polyethers such as polyethylene glycol, polypropylene glycol; and polyvinyl alcohol. Polyvinyl alcohol is particularly preferred.

Examples of the polyvinyl alcohol include a normal polyvinyl alcohol obtained by hydrolyzing polyvinyl acetate, as well as a modified polyvinyl alcohol such as a cationic modified polyvinyl alcohol; an anionic modified polyvinyl alcohol having an anionic group such as a carboxyl group; and a silyl modified polyvinyl alcohol having a silyl group. The higher the average degree of polymerization of polyvinyl alcohol, the larger the effect of inhibiting the generation of crack when forming an ink absorbing layer. Accordingly, when the average degree of polymerization is 5,000 or less, the viscosity of the emulsion resin is not high, which results in ease of handling at the time of production. Therefore, the average degree of polymerization is preferably 300 to 5000, more preferably 1500 to 5000, and particularly preferably 3000 to 4500. The saponification degree of polyvinyl alcohol is preferably 70 to 100 mol %, and more preferably 80 to 99.5 mol %.

<Other Additives of Each Refractive Index Layer>

A variety of additives applicable to a high refractive layer and a low refractive layer according to the present invention are listed below. For example, a variety of known additives such as: an ultraviolet absorber as described in JP-A-S57-74193, JP-A-S57-87988, JP-A-S62-261476 and the like; an anti-fading agent as described in JP-A-S57-74192, JP-A-S57-87989, JP-A-S60-72785, JP-A-H1-146591, JP-A-H1-95091, JP-A-H3-13376 and the like; a variety of anionic, cationic or nonionic surfactants; fluorescent whitening agent as described in JP-A-S59-42993, JP-A-S59-52689, JP-A-S62-280069, JP-A-S61-242871, JP-A-H4-219266 and the like; a pH adjuster such as sulfuric acid, phosphoric acid, acetic acid, citric acid, sodium hydroxide, potassium hydroxide, potassium carbonate, and the like; antifoaming agent; a lubricant such as diethylene glycol and the like; antiseptic; antistatic agent; matting agent; and the like can also be contained.

[Base Material]

The base material applied to a near-infrared reflective film of the present invention is preferably a film support, and the film support may be transparent or opaque. As such a film support, a variety of resin films can be employed, and a polyolefin film (polyethylene, polypropylene or the like), a polyester film (polyethylene terephthalate, polyethylene naphthalate or the like), polyvinyl chloride, cellulose triacetate or the like can be employed. Preferably, polyester film can be employed. The polyester film (hereinafter, referred to as "polyester") is not particularly limited, but is preferably a polyester comprising a dicarboxylic acid component and a diol component as main components, and having film-formability. Examples of the dicarboxylic acid component which is the main component include terephthalic acid, isophthalic acid, phthalic acid, 2,6-naphthalene dicarboxylic acid, 2,7-naphthalene dicarboxylic acid, diphenylsulfone dicarboxylic acid, diphenyl ether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, phenylindane dicarboxylic acid. Examples of the diol component include ethylene glycol, propylene glycol, tetramethylene glycol, cyclohexanedimethanol, 2,2-bis(4-hydroxyphenyl)propane, 2,2-bis(4-hydroxyethoxy phenyl)propane, bis(4-hydroxyphenyl)sulfone, bisphenol fluorene dihydroxy ethyl ether, diethylene glycol, neopentyl glycol, hydroquinone, cyclohexane diol. Among the polyesters comprising the above-mentioned component as the main component, from the viewpoint of transparency, mechanical strength, dimensional stability or the like, a polymer comprising terephthalic acid or 2,6-naphthalene dicarboxylic acid as the dicarboxylic acid component, and comprising ethylene glycol or 1,4-cyclohexanedimethanol as the diol component is preferred. Among these, a polymer comprising polyethylene terephthalate or polyethylene naphthalate as the main component, a copolymer polyester composed of terephthalic acid, 2,6-naphthalene dicarboxylic acid and ethylene glycol, and a polyester comprising a mixture of two or more types of these polyesters as the main component are preferred.

The thickness of the film support according to the present invention is preferably 10 to 300 μm, and more preferably 20 to 150 μm. The film support of the present invention may be the one obtained by combining two sheets; in this case, the types thereof may be the same or different.

[Production Method of Near-Infrared Reflective Film]

In a method of producing a near-infrared reflective film of the present invention, the near-infrared reflective film is formed by laminating a unit constituted by a high refractive layer and a low refractive layer on a base material. Specifically, a laminated body is preferably formed by alternate coating of a high refractive layer and a low refractive layer and drying.

As the coating method, for example, a roll coating method, a rod bar coating method, an air knife coating method, a spray coating method, a curtain coating method, or a slide bead coating method, an extrusion coating method or the like which uses a hopper as described in U.S. Pat. No. 2,761,419 and U.S. Pat. No. 2,761,791 is preferably used.

When simultaneous multiple layer coating is performed, the viscosities of high refractive layer coating liquid and low refractive layer coating liquid during coating are, in the case of using a slide bead coating method, preferably in a range of 5 to 100 mPa·s, and more preferably in a range of 10 to 50 mPa·s. When a curtain coating method is used, the viscosities are preferably in a range of 5 to 1200 mPa·s, and more preferably in a range of 25 to 500 mPa·s.

The viscosity of the coating liquid at 15° C. is preferably 100 mPa·s or higher, more preferably 100 to 30,000 mPa·s, still more preferably 3,000 to 30,000 mPa·s, and most preferably 10,000 to 30,000 mPa·s.

As a coating and drying method, preferred is a method in which a high refractive layer coating liquid and a low refractive layer coating liquid are heated to 30° C. or higher, and coating is performed, and then the temperature of a film formed is cooled to a temperature of 1 to 15° C. temporarily to be dried at 10° C. or higher, and more preferred is a method in which the drying is performed under a drying condition at a wet bulb temperature in a range of 5 to 50° C., and at a film surface temperature in a range of 10 to 50° C. As a cooling method just after coating, from the viewpoint of uniformity of a film formed, a horizontal setting method is preferably used.

In the present invention, in the preparation of the above-mentioned high refractive layer coating liquid, the high refractive layer is preferably formed by using an aqueous high refractive layer coating liquid prepared by adding and dispersing a rutile-type titanium oxide having a volume average particle size of 100 nm or smaller. In this case, the high refractive layer coating liquid is preferably prepared by adding a rutile-type titanium oxide as an aqueous titanium oxide sol having a pH of from 1.0 to 3.0 and in which the zeta potential of the titanium particle is positive, to the high refractive layer coating liquid.

[Application of Near-Infrared Reflective Film]

The near-infrared reflective film of the present invention can be applied to a wide variety of fields. For example, the film is bonded with an equipment which is exposed in sunlight for a long time such as an exterior window of a building or an automotive window, and is used as a film for sticking to a window such as heat reflecting to give the effect of heat reflecting, a film for a plastic greenhouse for agriculture, mainly for the purpose of increasing the weather resistance.

In particular, the near-infrared reflective film according to the present invention is suitable for a member in which the film is bonded to a substrate such as a glass or a glass substitute resin directly or via an adhesive.

An adhesive is placed such that a near-infrared reflective film is on the side of the plane of incidence of sunlight (heat ray) when the film is bonded to a window glass or the like. When the near-infrared reflective film is sandwiched between the window glass and the base material, the film can be sealed against an ambient gas such as moisture, which is favorable for the durability. The near-infrared reflective film of the present invention is also placed exteriorly or outside of an automobile (for sticking on the exterior), and has environmental durability, which is preferable.

As the adhesive which is applicable to the present invention, an adhesive comprising a light-curing or heat-curing resin as a main ingredient can be used.

The adhesive is preferably the one which has durability against ultraviolet rays. An acrylic-based adhesive or a silicone-based adhesive is preferred. Further, from the viewpoint of adhesive property or cost, an acrylic-based adhesive is preferred. In particular, due to the ease of control of the anti-peeling-off property, acrylic adhesive is preferred among solvent-based and emulsion-based acrylic adhesives. When a solution-polymerized polymer is used as a solvent-based acrylic adhesive, as the monomer thereof, a known monomer can be used.

A polyvinyl butyral resin used as an interlayer of a laminated glass, or an ethylene-vinyl acetate copolymer resin may be used. Specific examples thereof include plastic polyvinyl butyral (manufactured by SEKISUI CHEMICAL CO., LTD., Mitsubishi Monsanto Co., ltd. or the like), ethylene-vinyl acetate copolymer (manufactured by E. I. du Pont de Nemours and Company or manufactured by Takeda Pharmaceutical Company Limited; Duramin), modified ethylene-vinyl acetate copolymer (manufactured by Tosoh Corporation; Melthene-G). To the adhesive layer, ultraviolet absorber, antioxidant, antistatic agent, heat stabilizer, lubricant, filler, colorant, adhesion adjusting agent and/or the like may be appropriately added and compounded.

EXAMPLES

The present invention will now be specifically described by way of Examples, but not limited thereto. In Examples, a term "parts" or "1" is used, and unless otherwise specified, they refer to "parts by mass" or "mass %", respectively.

Example 1

<<Production of Near-Infrared Reflective Film>>
[Production of Sample 1]
(Preparation of Coating Liquid for Forming a High Refractive Layer)
<Metal Oxide Particle for High Refractive Layer: Preparation of Titanium Oxide Sol>
A rutile-type titanium oxide particle was prepared according to the following method as a metal oxide particle used for forming a high refractive index.

To 10 L (liter) of an aqueous suspension obtained by suspending a titanium dioxide hydrate in water ($TiO_2$ concentration: 100 g/L), 30 L of aqueous sodium hydroxide solution (concentration: 10 mole/L) was added with stirring, and the suspension was heated to 90° C. and matured for five hours, followed by neutralization with hydrochloric acid, filtration and washing with water. In the above-mentioned reaction (treatment), for the titanium dioxide hydrate, those obtained by thermal hydrolysis of aqueous titanium sulfate solution according to a known method was used.

A base-treated titanium compound was suspended in pure water such that the $TiO_2$ concentration was 20 g/L, and a citric acid was added thereto by 0.4 mol % with respect to the amount of $TiO_2$, followed by heating. At the time when the temperature of the suspension reached 95° C., concentrated hydrochloric acid was added thereto such that the hydrochloric acid concentration was 30 g/L, followed by stirring for three hours while maintaining the temperature of the liquid, whereby a titanium oxide particle sol was prepared such that the titanium oxide particle was adjusted to 20% by mass.

For the titanium oxide particle sol obtained, the particle size was measured using Zetasizer Nano manufactured by Malvern Instruments Ltd. As the result, the volume average particle size was 35 nm, and the degree of monodispersion was 16%. The titanium oxide particle sol was dried at 105° C. for three hours to obtain a particle powder, and X-ray diffraction measurement was performed using JDX-3530 type) manufactured by JEOL DATUM Co., Ltd. to confirm that the powder was a rutile-type titanium dioxide particle. The refractive index of the rutile-type titanium dioxide particle was measured using U-4000 type (manufactured by Hitachi, Ltd.) to obtain 2.76.

<Preparation of Coating Liquid 1 for Forming High Refractive Layer>
While stirring 50 g of the above-mentioned prepared titanium oxide particle sol (titanium oxide: 10 g), 30 g of gelatin solution 1 obtained by dissolving 1) HACP-01 (collagen tripeptide manufactured by JELLICE Co., Ltd.) as a water-soluble polymer in pure water in a concentration of 10% by mass was added thereto, followed by heating to 90° C. The stirring was continued while heating for three hours, followed by cooling to 50° C. Then, 200 g of gelatin solution 2 having 2.1% by mass of 2) P509 (pig-skin acid-treated gelatin manufactured by JELLICE Co., Ltd.) and 0.51 of Kohtamin 24P (quaternary ammonium salt based cationic surfactant, manufactured by Kao Corporation) as a surfactant were added thereto, thereby preparing a coating liquid 1 for forming a high refractive layer.

(Preparation of Coating Liquid for Forming Low Refractive Layer)
<Metal Oxide Particle for Low Refractive Layer: Silicon Oxide Particle>
SNOWTEX OXS (manufactured by Nissan Chemical Industries, Ltd., colloidal silica, average particle size 4 to 6 nm) was used. The refractive index of the silicon oxide particle is 1.44.

<Preparation of Coating Liquid 1 for Coating Low Refractive Layer>
A coating liquid 1 for forming a low refractive layer was prepared in the same manner as in the above-mentioned preparation of coating liquid 1 for forming a high refractive layer except that, in place of the titanium oxide particle sol, SNOWTEX OXS (manufactured by Nissan Chemical Industries, Ltd., colloidal silica, average particle size 4 to 6 nm) was used in the same quantity based on mass of the particles.

(Measurement of the Refractive Index of Coating Film)
The above-mentioned prepared coating liquid 1 for forming a high refractive layer and coating liquid 1 for forming a low refractive layer were applied to blue plate glasses each having a refractive index of 1.518 by a spin coater such that the film thickness after drying was about 1 μm, followed by drying on a hot plate for about five minutes at 80° C.

Next, the refractive indices of the high refractive layer coating film and low refractive layer coating film obtained were measured with F20 desktop film thickness measurement system (film thickness/refractive index measuring device manufactured by Filmetrics Japan, Inc.). As the result, the refractive index of the high refractive layer coating film was 1.90, and the refractive index of the low refractive layer coating film was 1.48.

Next, the refractive index of a dry coating film (water-soluble polymer) was measured in the same manner as above except that coating liquids constituted by a water-soluble polymer which were prepared such that a metal oxide particle is omitted in each of the above-mentioned coating liquid 1 for forming a high refractive layer and coating liquid 1 for forming a low refractive layer were used, and as the result, the refractive index was 1.52.

In other words, it was confirmed that the high refractive layer 1 was constituted by a water-soluble polymer having a refractive index of 1.52 and a rutile-type titanium dioxide particle (refractive index: 2.76) which is a metal oxide particle having a refractive index higher than that of the water-soluble polymer.

Similarly, it was confirmed that the low refractive layer 1 was constituted by a water-soluble polymer having a refractive index of 1.52 and a silicon oxide particle (refractive index: 1.44) which is a metal oxide particle having a refractive index lower than that of the water-soluble polymer.

The refractive index of each metal oxide particle was measured according to a method B (immersion method using a microscope (Becke line method)) described in "method for the determination of the refractive index of plastic" in JIS K7142.

(Formation of Laminated Body)
(Formation of Lower Layer Region)
<Formation of First Unit>

The coating liquid 1 for forming a high refractive layer prepared in the above was, while keeping warm at 45° C., applied to a polyethylene terephthalate film having a thickness of 50 μm which was heated to 45° C. in the condition of a dry film thickness of 161 nm by using a wire bar. Next, cool air was sprayed onto the film for one minute to set in the condition that the surface of the film was 15° C. or lower, followed by spraying warm air at 80° C. to dry the film to thereby form a high refractive layer 1.

Next, the coating liquid 1 for forming a low refractive layer was applied, while keeping warm at 45° C., to the high refractive layer 1 of the above-mentioned polyethylene terephthalate film which was heated to 45° C. in the condition of a dry film thickness of 118 nm by using a wire bar. Next, cool air was sprayed onto the film for one minute to set in the condition that the surface of the film was 15° C. or lower, followed by spraying warm air at 80° C. to dry the film to thereby form a low refractive layer 1, whereby a first unit constituted by a high refractive layer 1 having a dry film thickness of 161 nm and a low refractive layer 1 having a dry film thickness of 118 nm was formed.

<Formation of Second to Sixth Unit>

Similarly, second to sixth units each constituted by a high refractive layer 1 having a dry film thickness of 161 nm and a low refractive layer 1 having a dry film thickness of 118 nm were formed on the above formed first unit to form a lower layer region.

The total dry film thickness $\Sigma d1$ of the above formed lower layer region is 1675 nm.

(Formation of Upper Layer Region)
<Formation of Seventh Unit>

The coating liquid 1 for forming a high refractive layer prepared in the above was, while keeping warm at 45° C., applied to a sample on which a lower layer region was formed which was heated to 45° C. in the condition of a dry film thickness of 161 nm by using a wire bar. Next, cool air was sprayed onto the film for one minute to set in the condition that the surface of the film was 15° C. or lower, followed by spraying warm air at 80° C. to dry the film to thereby form a high refractive layer 7.

Next, the coating liquid 1 for forming a low refractive layer was applied, while keeping warm at 45° C., to the above-mentioned high refractive layer 7 which was heated to 45° C. in the condition of a dry film thickness of 118 nm by using a wire bar. Next, cool air was sprayed onto the film for one minute to set in the condition that the surface of the film was 15° C. or lower, followed by spraying warm air at 80° C. to dry the film to thereby forma low refractive layer 7, whereby a seventh unit constituted by a high refractive layer 7 having a dry film thickness of 161 nm and a low refractive layer 7 having a dry film thickness of 118 nm was formed.

<Formation of Eighth to 12th Units>

Similarly, eighth to 12th units each constituted by a high refractive layer 7 having a dry film thickness of 161 nm and a low refractive layer 7 having a dry film thickness of 118 nm were formed on the above formed seventh unit to form a upper layer region, whereby a sample 1 which was a near-infrared reflective film was produced.

The total dry film thickness $\Sigma d2$ of the above formed upper layer region is 1675 nm, and $\Sigma d1/d2$ of sample 1 is 1.00.

The above-mentioned film thickness of each layer was determined by cutting the sample 1 in which all units were formed and by photographing and analyzing the cross-section thereof using a scanning electron microscope.

[Production of Samples 2 to 11]

Samples 2 to 11 having $\Sigma d1/\Sigma d2$ described in Table 1 were produced in the same manner as in the above-mentioned production of sample 1, except that the dry film thicknesses of the high refractive layer and low refractive layer constituting the first to sixth units of the lower layer region and the dry film thicknesses of the high refractive layer and low refractive layer constituting the seventh to 12th units of the upper layer region were changed according to the conditions described in Table 1.

<<Measurement • Evaluation of the Characteristic Values of Near-Infrared Reflective Film>>

The near-infrared reflectivity and the visible light reflection irregularity resistance of the samples 1 to 11 which were the near-infrared reflective films produced above were measured and evaluated.

(Measurement Near-Infrared Reflectivity)

By using a spectrophotometer (manufactured by Hitachi, Ltd., U-4000 type; integrating sphere was used), the reflectivity of each near-infrared reflective film in a region of 800 nm to 1300 nm was measured, and the average reflectivity thereof was determined to be defined as the near-infrared reflectivity.

(Evaluation of Visible Light Reflection Irregularity Resistance)

By using a spectrophotometer (manufactured by Hitachi, Ltd., U-4000 type; integrating sphere was used), the reflectivity of each near-infrared reflective film in a region of 380 nm to 780 nm was measured, and the difference (%) between the maximum reflectivity value (%) and the minimum reflectivity value (%) thereof was determined to be defined as a scale for the visible light reflection irregularity resistance. The smaller the value thereof, the smaller the difference in the reflectivity in the visible light region, which represents small reflection irregularity.

The results determined by the above are listed on Table 1.

TABLE 1

| | lower layer region | | | upper layer region | | | | Evaluation result | | |
|---|---|---|---|---|---|---|---|---|---|---|
| | First to sixth units (12 layers) | | | seventh to 12th units (12 layers) | | | | | | |
| Sample # | High refractive layer dry film thickness (nm) | Low refractive layer dry film thickness (nm) | Total dry film thickness $\Sigma d1$ (nm) | High refractive layer dry film thickness (nm) | Low refractive layer dry film thickness (nm) | Total dry film thickness $\Sigma d2$ (nn) | Film thickness ratio $\Sigma d1/\Sigma d2$ | Near-infrared reflectivity (%) | Visible light reflection irregularity resistance (%) | Remark |
| 1 | 161 | 118 | 1675 | 161 | 118 | 1675 | 1.00 | 44 | 50 | Comparative Example |
| 2 | 305 | 225 | 3182 | 161 | 118 | 1675 | 1.90 | 51 | 92 | Comparative Example |
| 3 | 321 | 237 | 3350 | 161 | 118 | 1675 | 2.00 | 51 | 93 | Comparative Example |
| 4 | 209 | 154 | 2177 | 161 | 118 | 1675 | 1.30 | 84 | 64 | the present invention |
| 5 | 225 | 166 | 2345 | 161 | 118 | 1675 | 1.40 | 78 | 59 | the present invention |
| 6 | 241 | 178 | 2512 | 161 | 118 | 1675 | 1.50 | 69 | 55 | the present invention |
| 7 | 257 | 189 | 2680 | 161 | 118 | 1575 | 1.60 | 60 | 42 | the present invention |
| 8 | 289 | 213 | 3015 | 161 | 118 | 1675 | 1.80 | 53 | 45 | the present invention |
| 9 | 169 | 124 | 1759 | 161 | 118 | 1675 | 1.05 | 55 | 20 | the present invention |
| 10 | 193 | 142 | 2010 | 161 | 118 | 1675 | 1.20 | 79 | 21 | the present invention |
| 11 | 201 | 148 | 2094 | 161 | 118 | 1675 | 1.25 | 84 | 27 | the present invention |

As is clear from the results described in Table 1, it is understood that a near-infrared reflective film having the layer constitution defined in the present invention has a higher near-infrared reflectivity than that of Comparative Example, and has a smaller reflection irregularity in the visible light region than that of Comparative Example.

More specifically, when, using a sample 1 of Comparative Example whose $\Sigma d1/\Sigma d2$ is 1.00 as a standard, the near-infrared reflectivities in 800 to 1300 nm are compared, it is understood that, while the near-infrared reflectivities of samples 2 and 3 of Comparative Example whose $\Sigma d1/\Sigma d2$ is 1.9 or higher vary a little, the near-infrared reflectivities of samples 4 to 11 of Example whose $\Sigma d1/\Sigma d2$ is 1.05 to 1.80 are high. Further, focusing on samples 9 to 11 of Example whose $\Sigma d1/\Sigma d2$ is 1.05 to 1.25 times, it is understood that the reflection irregularity in the visible light region is much decreased. The reflection spectrum of each sample in 380 nm to 1300 nm was produced and evaluated. As the result, in Comparative Example, while the film has a rectangle reflect peak in 800 to 1,000 nm, a peak of near-infrared reflection was hardly observed in 1,000 to 1,300 nm.

Example 2

[Production of Near-Infrared Reflectors 4 to 11]
By using the near-infrared reflective films of the samples 4 to 11 produced in Example 1, near-infrared reflectors 4 to 11 were produced. On 5 mm thick, 20 cm×20 cm transparent acrylic resin plates, near-infrared reflective films of samples 4 to 11 were bonded with an acrylic adhesive, respectively to produce near-infrared reflectors 4 to 11.
[Evaluation]
The near-infrared reflectors 4 to 11 of the present invention produced above can be easily utilized despite the large size thereof. By utilizing the near-infrared reflective film of the present invention, an excellent near-infrared reflectivity was confirmed.

The invention claimed is:
1. A near-infrared reflective film having
a constitution in which, on a base material, high refractive layers and low refractive layers are alternately laminated individually to form at least two units,
wherein each of said units consists of one of said high refractive layers and one of said low refractive layers, each of said high refractive layers containing a water-soluble polymer and a metal oxide particle having a refractive index higher than the refractive index of the water-soluble polymer and each of said low refractive layers containing a water-soluble polymer and a metal oxide particle having a refractive index lower than the refractive index of the water-soluble polymer,
wherein a transmittance of the film in a visible light region according to JIS R3106-1998 is 50% or higher,
wherein each of the high refractive layers and the low refractive layers has a thickness of 20 nm or more,
wherein the total number of the layers of the high refractive layers and the low refractive layers is n, the total film thickness of the component layers from the region of n/2 to the base material is $\Sigma d1$, the total film thickness of the component layers from the region of n/2 to the outermost layer is $\Sigma d2$, and the film thickness ratio $\Sigma d1/\Sigma d2$ is from 1.20 to 1.40, and
wherein a total film thickness of the high refractive layers from the region of n/2 to the base material is greater than a total film thickness of the high refractive layers from the region of n/2 to the outermost layer.
2. A near-infrared reflector comprising, on the at least one side of a substrate, the near-infrared reflective film according to claim 1.
3. The near-infrared reflective film according to claim 1, wherein the water-soluble polymer of the high refractive layers is the same as the water-soluble polymer of the low refractive layer.

4. The near-infrared reflective film according to claim 1, wherein each of the high refractive layers in the component layers from the region of n/2 to the base material has a thickness of not less than 169 nm, and each of the high refractive layers in the component layers from the region of n/2 to the base material has a refractive index of not less than 1.90.

5. The near-infrared reflective film according to claim 1, wherein each of the high refractive layers in the component layers from the region of n/2 to the base material has a thickness of 169 nm to 1,000 nm, and each of the high refractive layers in the component layers from the region of n/2 to the base material has a refractive index of 1.90 to 2.20.

6. The near-infrared reflective film according to claim 1, wherein a total film thickness of the low refractive layers from the region of n/2 to the base material is greater than a total film thickness of the low refractive layers from the region of n/2 to the outermost layer.

7. The near-infrared reflective film according to claim 1, wherein each of the high refractive layers and the low refractive layers has a thickness of 50 nm or more.

8. The near-infrared reflective film according to claim 1, wherein a reflection irregularity of the film in the visible light region is 64% or less.

9. The near-infrared reflective film according to claim 1, each high refractive layer in the region of n/2 to the base material has a greater thickness than each high refractive layer in the region of n/2 to the outermost layer.

10. The near-infrared reflective film according to claim 1, each low refractive layer in the region of n/2 to the base material has a greater thickness than each low refractive layers in the region of n/2 to the outermost layer.

* * * * *